United States Patent
Yamaguchi et al.

(10) Patent No.: US 8,390,793 B2
(45) Date of Patent: Mar. 5, 2013

(54) OPTICAL RANGING SENSOR AND ELECTRONIC EQUIPMENT

(75) Inventors: Akifumi Yamaguchi, Osaka (JP); Hideo Wada, Osaka (JP); Masaru Kubo, Osaka (JP); (Jason) Chih-Hung Lu, Hsin-Chu (TW)

(73) Assignees: Sharp Kabushiki Kaisha, Osaka (JP); Pixart Imaging Inc., Hsin-Chu (TW)

( * ) Notice: Subject to any disclaimer, the term of this patent is extended or adjusted under 35 U.S.C. 154(b) by 3 days.

(21) Appl. No.: 12/978,700

(22) Filed: Dec. 27, 2010

(65) Prior Publication Data

US 2011/0194097 A1    Aug. 11, 2011

(30) Foreign Application Priority Data

Feb. 9, 2010 (JP) .................................. 2010-026599

(51) Int. Cl.
*G01C 3/08* (2006.01)
(52) U.S. Cl. ......... 356/4.01; 356/3.01; 356/3.1; 356/4.1
(58) Field of Classification Search ........ 356/3.01–3.15, 356/4.01–4.1, 5.01–5.15, 6–22, 28, 28.5
See application file for complete search history.

(56) References Cited

U.S. PATENT DOCUMENTS

| | | | | |
|---|---|---|---|---|
| 5,076,687 A | * | 12/1991 | Adelson | 356/4.04 |
| 5,132,546 A | * | 7/1992 | Tower | 250/559.38 |
| 5,218,427 A | * | 6/1993 | Koch | 356/602 |
| 5,665,957 A | * | 9/1997 | Lee et al. | 369/53.23 |
| 5,866,915 A | * | 2/1999 | Pryor et al. | 250/559.2 |
| 6,157,040 A | | 12/2000 | Bauer | |
| 6,400,671 B2 | * | 6/2002 | Hayashi et al. | 369/112.12 |
| 7,046,344 B2 | * | 5/2006 | Yamamoto et al. | 356/4.01 |
| 7,589,825 B2 | * | 9/2009 | Orchard et al. | 356/4.03 |
| 7,636,158 B1 | * | 12/2009 | Pawluczyk et al. | 356/326 |

(Continued)

FOREIGN PATENT DOCUMENTS

| | | |
|---|---|---|
| JP | 10-332326 | 12/1998 |
| JP | 2000-121353 | 4/2000 |

(Continued)

*Primary Examiner* — Luke Ratcliffe
(74) *Attorney, Agent, or Firm* — Birch, Stewart, Kolasch & Birch, LLP

(57) ABSTRACT

An optical ranging sensor includes a light emitting unit for projecting a light beam on an object to be measured, a light receiving unit on which a light spot of reflected light of the light beam from the object is formed, and a processing circuit unit for processing output signals from the light receiving unit and detecting a distance to the object. The light receiving unit includes an effective light receiving part having light receiving cells arranged in matrix form in a first direction in which a position of the light spot moves as the object moves along a direction of an optical axis of the light emitting unit, and in a second direction orthogonal to the first direction. A size of the effective light receiving part in the second direction is not smaller than a radius of the light spot but not larger than a diameter thereof.

18 Claims, 7 Drawing Sheets

U.S. PATENT DOCUMENTS

| | | | |
|---|---|---|---|
| 2002/0196424 A1* | 12/2002 | Sano et al. | 356/4.01 |
| 2003/0133091 A1* | 7/2003 | Kongable | 356/4.01 |
| 2005/0206873 A1* | 9/2005 | Tanaka et al. | 356/4.03 |
| 2006/0044546 A1* | 3/2006 | Lewin et al. | 356/4.04 |
| 2008/0049210 A1 | 2/2008 | Takaoka | |
| 2008/0221711 A1* | 9/2008 | Trainer | 700/54 |
| 2009/0146967 A1* | 6/2009 | Ino et al. | 345/173 |
| 2009/0185158 A1* | 7/2009 | Wolf et al. | 356/4.01 |
| 2009/0195790 A1* | 8/2009 | Zhu et al. | 356/612 |
| 2010/0045963 A1* | 2/2010 | Yamaguchi et al. | 356/4.01 |

FOREIGN PATENT DOCUMENTS

| | | |
|---|---|---|
| JP | 2002-195807 A | 7/2002 |
| JP | 2006-38571 A | 2/2006 |
| JP | 2008-51764 | 3/2008 |

* cited by examiner

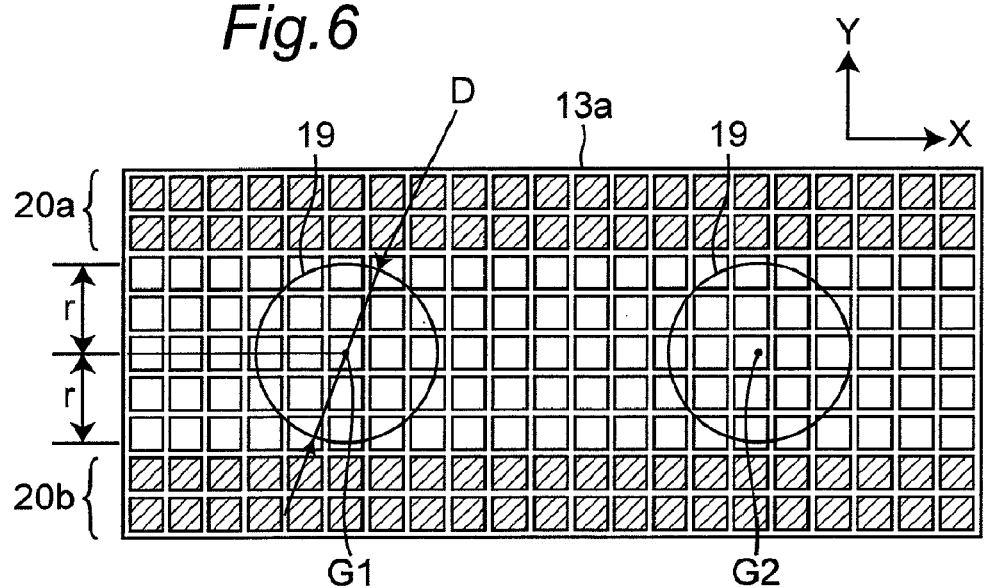
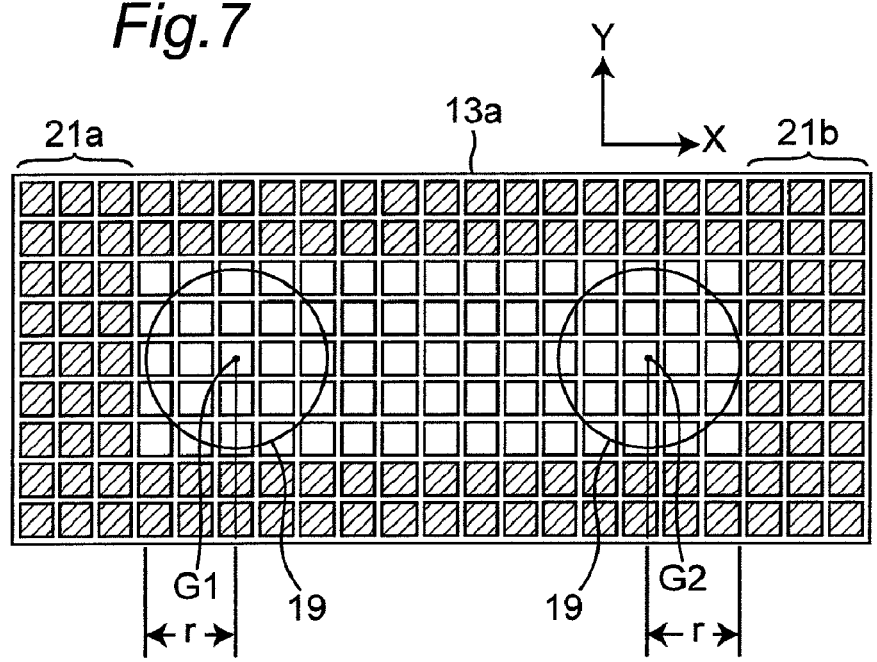

OPTICAL RANGING SENSOR AND ELECTRONIC EQUIPMENT

BACKGROUND OF THE INVENTION

1. Field of the Invention

The present invention relates to an optical ranging sensor for detecting a distance to an object and also relates to electronic equipment having the optical ranging sensor installed therein.

2. Description of the Related Art

As optical ranging sensors for detecting a distance to an object, conventionally, there have been an optical displacement measuring device (JP 2002-195807 A: Patent Literature 1) and an optical displacement gauge (JP 2006-38571 A: Patent Literature 2) in which light radiated from a light emitting element such as a laser diode is condensed by a light projecting lens, and a resultant beam is projected on an object to be measured, and then a portion of diffuse reflectance light, reflected by a surface of the object to be measured, is condensed by a light receiving lens so as to form a received light spot on a light receiving surface of an MOS (metal oxide semiconductor) image sensor, and finally the distance to the object to be measured is detected on basis of the position of the received light spot on the light receiving surface.

FIG. 11 shows a schematic configuration of the optical displacement measuring device disclosed in Patent Literature 1 and the optical displacement gauge disclosed in Patent Literature 2. As shown in FIG. 11, a CMOS (complementary metal oxide semiconductor) image sensor 1 as a light receiving element is not flush with a laser diode 2 as the light emitting element, and packages of the CMOS image sensor 1 and the laser diode 2 are separately formed. A signal processing unit 3 for processing signals outputted from the CMOS image sensor 1 and a driving circuit unit (not shown) for the laser diode 2 are formed outside a chip of the CMOS image sensor 1, and the CMOS image sensor 1, the signal processing unit 3, and the driving circuit unit are not provided in one chip.

FIG. 12 shows a plan view of the CMOS image sensor 1. A size of an effective light receiving part 1a in the CMOS image sensor 1 is required to be set in consideration of various variations in size, position and the like of a light spot 4 formed on the effective light receiving part 1a so that the position of the light spot 4 is within the effective light receiving part 1a even if the position varies. This point, however, is described neither in Patent Literature 1 nor in Patent Literature 2. The size of the effective light receiving part 1a is presumed to be considerably large from a moving range of the light spot 4 that moves with movement of the object to be measured and the size of the light spot 4.

The conventional optical displacement measuring device disclosed in Patent Literature 1 and the conventional optical displacement gauge disclosed in Patent Literature 2 have problems as follows.

The CMOS image sensor 1 is used as the light receiving element in such a conventional optical ranging sensor as described above. The effective light receiving part 1a of the CMOS image sensor 1, however, is not flush with the laser diode 2 as the light emitting element and the packages of the CMOS image sensor 1 and the laser diode 2 are separately formed, so that the CMOS image sensor 1, the signal processing unit 3, and the driving circuit unit are not provided in one chip. Accordingly, such an optical ranging sensor, which necessarily has a great overall size, causes problems of a large number of production processes, complexity of works in each process requiring accuracy, and increase in manufacturing cost.

Also, without any description about the size of the effective light receiving part 1a in the CMOS image sensor 1 therein, the size of the effective light receiving part 1a is presumed to be considerably large from the moving range of the light spot 4 that moves with movement of the object to be measured and the size of the light spot 4. Accordingly, a problem is caused in that the CMOS image sensor 1 involves a great chip size and hence great cost.

For determination of a center of gravity of the light spot 4 on the effective light receiving part 1a, as for characteristics, data from an unnecessary portion of the light receiving unit is captured and calculated because of the great size of the effective light receiving part 1a. This causes a problem in that increased time required for the calculation brings about increase in response time of the optical ranging sensor and increase in power consumption therein. Besides, the data from the unnecessary portion of the light receiving unit makes a noise in the determination of the center of gravity of the light spot 4, which noise results in decrease in S/N and increase in an error of a value of the determined center of gravity. As a result, there is caused a problem of deterioration in performance of the optical ranging sensor.

CITATION LIST

Patent Literature 1: JP 2002-195807 A
Patent Literature 2: JP 2006-38571 A

SUMMARY OF INVENTION

Technical Problem

An object of the invention is to provide an optical ranging sensor that is capable of accurately measuring a distance to an object to be measured even when the object is on a distant side of a measurable range of the optical ranging sensor and therefore only a small quantity of reflected light from the object is obtained, and that fulfils small size, high performance, low power consumption, high-speed response, and/or low cost, and also to provide electronic equipment having the optical ranging sensor installed therein.

Solution to Problem

In order to solve the above problem, an optical ranging sensor according to the present invention comprises:

a light emitting unit for projecting a light beam on an object to be measured, a light receiving unit on which reflected light resulting from reflection of the light beam from the object to be measured is incident and on which a light spot of the reflected light is formed, and a processing circuit unit for processing output signals from the light receiving unit and detecting a distance to the object to be measured, the light receiving unit comprising an effective light receiving part having a plurality of light receiving cells arranged in matrix form in a first direction in which a position of the light spot moves as the object to be measured moves along a direction of an optical axis of the light emitting unit, and in a second direction orthogonal to the first direction, and a size of the effective light receiving part in the second direction being not smaller than a radius of the light spot but not larger than a diameter thereof.

With the above configuration, reflected light resulting from a light beam projected from the light emitting unit and reflected by an object to be measured is incident on the light receiving unit, on which a light spot is formed, which light spot moves in the first direction as the object to be measured moves in the direction of the optical axis of the light emitting unit. The size of the effective light receiving part in the light receiving unit in the second direction orthogonal to the first direction is defined so as to be not less than the radius and not more than the diameter of the light spot. This makes it possible to reduce a size of a chip in which the light receiving unit is installed, while ensuring the size sufficient for determination of a center of gravity of the light spot, and hence to reduce a size of the whole optical ranging sensor and the manufacturing cost.

In one embodiment, the size of the effective light receiving part in the second direction is equal to the radius of the light spot.

In the embodiment, the size of the effective light receiving part in the second direction is equal to the radius of the light spot. Consequently, the size of the light receiving unit can be made the minimum necessary to find the center of gravity of the formed light spot can be found.

In one embodiment, the effective light receiving part is composed of the whole light receiving unit.

In the embodiment, the whole light receiving unit forms the effective light receiving part and thus ineffective light receiving portions composed of unnecessary portions of the light receiving unit can be eliminated. This leads to elimination of unnecessary signals from such ineffective light receiving portions and thus reduces processing time in the processing circuit unit and thus reduces response time of the optical ranging sensor and power consumption. In addition, the elimination of the unnecessary signals increases the S/N ratio in the signal processing and improves performance.

In one embodiment, the effective light receiving part is composed of an area in the light receiving unit, and areas except the effective light receiving part in the light receiving unit are blocked from functioning as a light receiving part for ranging.

In the embodiment, because areas except the effective light receiving part in the light receiving unit are blocked from functioning as a light receiving part for ranging, it is possible to eliminate unnecessary signals which otherwise would be generated from unnecessary portions. It is thus possible to reduce processing time in the processing circuit unit, and hence a response time of the optical ranging sensor and power consumption. In addition, the elimination of the unnecessary signals increases the S/N ratio in the signal processing and improves performance.

In one embodiment, the effective light receiving part is an area that has a center in the second direction on a position of a center of gravity or a light intensity peak of the light spot formed on the light receiving unit and that has a width in the second direction defined as having a value selected from a range of from a design radius of the light spot to a design diameter of the light spot.

According to the embodiment, the effective light receiving part can be defined on the basis of the position of the center of gravity or light intensity peak of the light spot that is actually formed on the light receiving unit and thus can be defined during a process of manufacturing the optical ranging sensor. This makes it possible to optimally set the effective light receiving part for each product with respect to the position and size of the actual light spot, even if variation occurs with respect to a design position of the light spot in the manufacturing processes.

In one embodiment, the effective light receiving part is an area in the effective light receiving part having the defined width in the second direction, which area is between a position defined outside, in the first direction, of a position of a center of gravity or a light intensity peak of a long-distance side light spot by the design radius of the light spot, the long-distance side light spot being a light spot formed on the light receiving unit when the object to be measured is in a position at a longest distance of a measurable range, and a position defined outside, in the first direction, of a position of a center of gravity or a light intensity peak of a short-distance side light spot by the design radius of the light spot, the short-distance side light spot being a light spot formed on the light receiving unit when the object to be measured is in a position at a shortest distance of the measurable range.

According to the embodiment, a length in the first direction of the effective light receiving part having the defined width in the second direction can be defined. This makes it possible to set the effective light receiving part optimally and in a minimum size for each product with respect to the position and size of the actual light spot even if variation occurs with respect to a design position of the light spot in the manufacturing process.

In one embodiment, the effective light receiving part is an area that has a center in the second direction on a position of a light intensity peak of the light spot formed on the light receiving unit and that has a width in the second direction defined by a size, measured in the second direction, of a region in a light intensity distribution of the light spot which region shows a light intensity at a specified percentage of the light intensity peak.

In the embodiment, the effective light receiving part can be defined on the basis of the position of a light intensity peak and the light intensity distribution of the light spot that is actually formed on the light receiving unit and thus can be defined during a process of manufacturing the optical ranging sensor. This makes it possible to precisely define the effective light receiving part for each product with respect to the position and size of the actual light spot, even if variation occurs with respect to a design position of the light spot in the manufacturing process.

In one embodiment, the effective light receiving part is an area in the effective light receiving part having the defined width in the second direction, which area is between a position defined outside, in the first direction, of a position of a light intensity peak of a long-distance side light spot by a half of a size measured in the first direction of a region that shows a light intensity at a specified percentage of the light intensity peak, the long-distance side light spot being a light spot formed on the light receiving unit when the object to be measured is in a position at a longest distance of a measurable range, and a position defined outside, in the first direction, of a position of a light intensity peak of a short-distance side light spot by a half of a size measured in the first direction of a region that shows a light intensity at the specified percentage of the light intensity peak, the short-distance side light spot being a light spot formed on the light receiving unit when the object to be measured is in a position at a shortest distance of the measurable range.

According to the embodiment, the length in the first direction of the effective light receiving part having the defined width in the second direction can be defined. This makes it possible to define the effective light receiving part precisely and in a minimum size for each product with respect to the position and size of the actual light spot even if variation occurs with respect to a design position of the light spot in the manufacturing process.

In one embodiment, the specified percentage of the light intensity peak is a value selected from a range of from 10% to 50%, inclusive, of the light intensity at the light intensity peak.

According to the embodiment, the width of the effective light receiving part in the second direction is defined so as to be as large as the size, measured in the second direction, of the region of the light intensity distribution of the light spot which region shows a light intensity of from 10% to 50%, inclusive, of the light intensity at the light intensity peak. Thus the size of the effective light receiving part in the second direction can be defined so as to be not less than the radius and not more than the diameter of the light spot. This makes it possible to reduce a size of a chip in which the light receiving unit is installed.

In one embodiment, the optical ranging sensor further comprises:

a signal processing software memory unit in which a program for signal processing to be performed by the processing circuit unit is stored, a memory unit in which data including data obtained from the signal processing performed by the processing circuit unit is stored, and a driving circuit unit for driving the light emitting element with specified timing, wherein the light emitting unit and the light receiving unit are installed on an identical plane, and wherein the processing circuit unit, the signal processing software memory unit, the memory unit, and the driving circuit unit, together with the light receiving unit, are formed in one chip.

According to the embodiment, the light emitting unit and the light receiving unit are mounted on the identical plane. In addition, the processing circuit unit, the signal processing software memory unit, the memory unit, and the driving circuit unit, together with the light receiving unit, are composed in one chip. Thus the size of the optical ranging sensor as a whole and the manufacturing cost for the sensor can be reduced.

Electronic equipment according to the present invention includes the above-described optical ranging sensor of the invention.

Because the electronic equipment includes the optical ranging sensor that can fulfill small size, high performance, low power consumption, high-speed response, and low cost, a distance to an object to be measured by the electronic equipment can accurately and quickly be measured. Increase in size, power consumption, and cost caused by the installation of the optical ranging sensor can be minimized.

Advantageous Effects of Invention

As is apparent from the above, in the optical ranging sensor of the invention, regarding the effective light receiving part of the light receiving unit on which reflected light of a light beam projected from the light emitting unit and reflected by an object to be measured is incident, the size of the effective light receiving part in the second direction orthogonal to the first direction, in which direction the light spot moves as the object to be measured moves in the direction of the optical axis of the light emitting unit, is set to be not less than the radius and not more than the diameter of the light spot. Thus, it is possible to reduce a size of a chip in which the light receiving unit is installed, while ensuring the size sufficient for determination of a center of gravity of the light spot, and hence to reduce a size of the whole optical ranging sensor and the manufacturing cost.

Furthermore, when the whole light receiving unit forms the effective light receiving part, or when areas except the effective light receiving part in the light receiving unit are blocked from functioning as a light receiving part for ranging, it is possible to eliminate unnecessary signals from the areas other than the effective light receiving part. This will reduce processing time in the processing circuit unit and thus reduces response time of the optical ranging sensor and power consumption. In addition, the elimination of the unnecessary signals increases the S/N ratio in the signal processing and improves performance.

Also, the electronic equipment of the invention includes the optical ranging sensor that can fulfill small size, high performance, low power consumption, high-speed response, and low cost. Thus, a distance to an object to be measured by the electronic equipment can accurately and quickly be measured. Increase in size, power consumption, and cost caused by the installation of the optical ranging sensor can be minimized.

BRIEF DESCRIPTION OF DRAWINGS

The present invention will become more fully understood from the detailed description given hereinbelow and the accompanying drawings which are given by way of illustration only, and thus are not intended to limit the present invention, and wherein:

FIG. 6 is an illustration for explaining a method of defining an effective light receiving part in the position detecting light receiving unit of FIG. 2 which method is different from a method of FIGS. 3 through 5;

FIG. 7 is an illustration for explaining a method of defining the effective light receiving part which method is different from that of FIG. 6;

DETAILED DESCRIPTION OF THE INVENTION

Figure 1A:
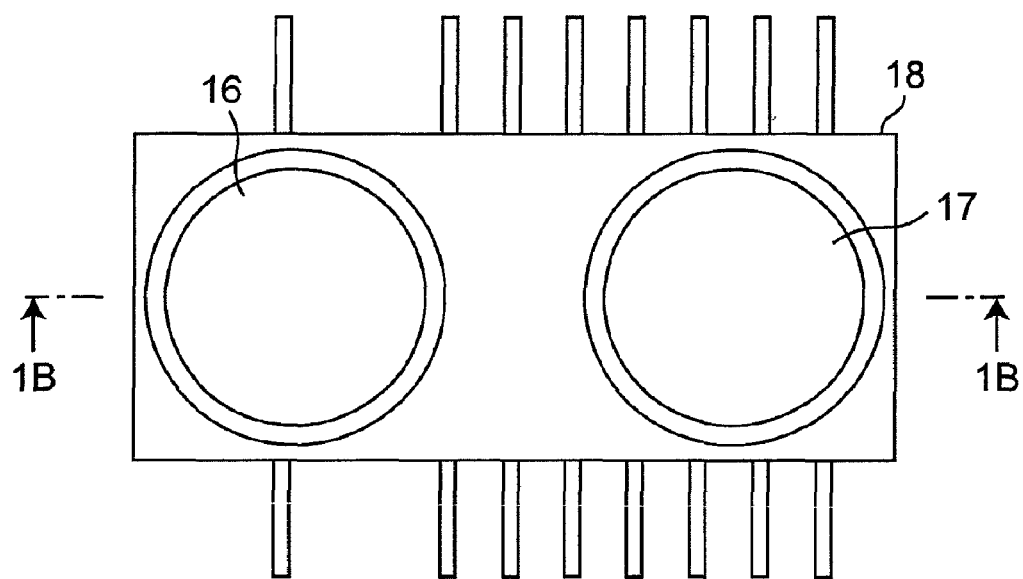
FIGS. 1A and 1B are a plan view and a sectional view showing a schematic configuration of an optical ranging sensor of the invention.
Figure 1B:
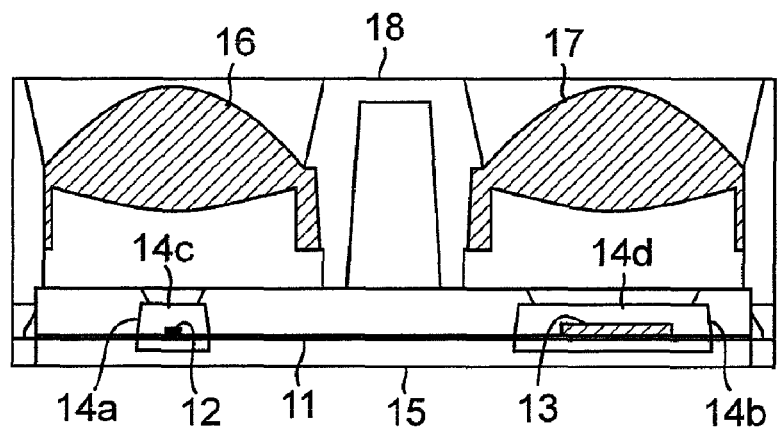

Hereinbelow, the invention will be described in detail with reference to embodiments shown in the drawings. FIGS. 1A and 1B are diagrams showing a schematic configuration of an optical ranging sensor in accordance with the embodiment.

FIG. 1A is a plan view and FIG. 1B is a sectional view taken along a line 1B-1B in FIG. 1A.

Figure 2:
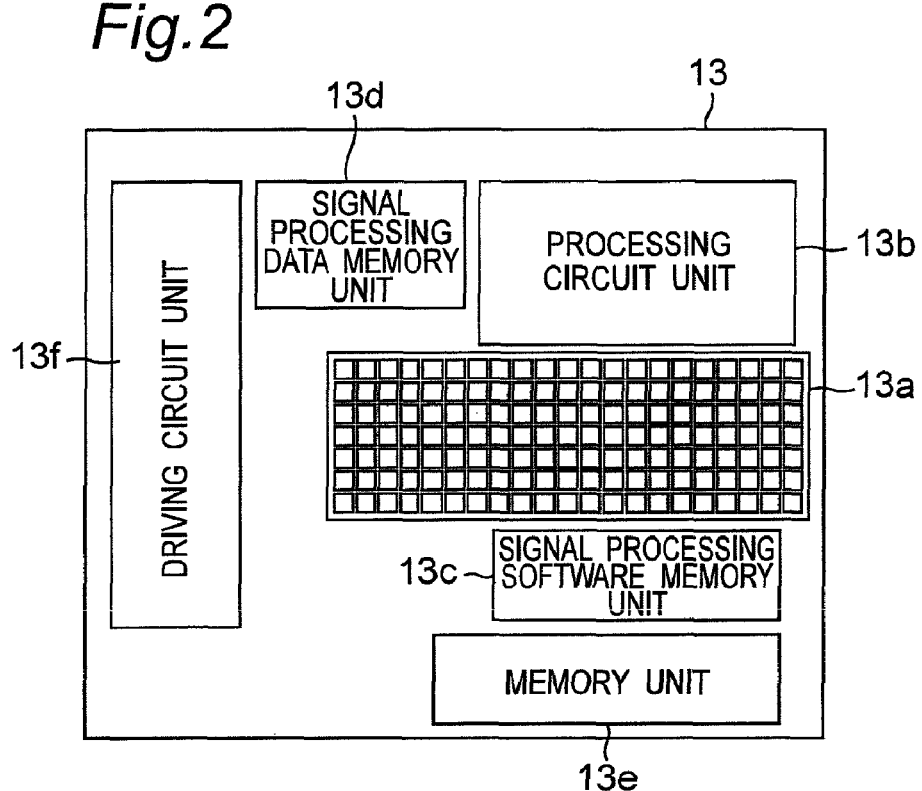
FIG. 2 is a diagram showing an internal configuration of a light receiving element in FIG. 1B.

In the optical ranging sensor, as shown in FIG. 1B, a light emitting element 12 composed of an infrared LED (light emitting diode), an infrared surface emission laser, or the like, and a light receiving element 13 are provided on a lead frame 11. As shown in FIG. 2, the light receiving element 13 includes a position detecting light receiving unit 13a composed of a CMOS area sensor, a CCD (charge coupled device) area sensor, or a photodiode array, of m rows and n columns (m≧2, n≧2), a processing circuit unit 13b for processing signals outputted from the position detecting light receiving unit 13a, a signal processing software memory unit 13c for storing programs for signal processing, a signal processing data memory unit 13d for storing data obtained from the signal processing, a memory unit 13e composed of a flash memory (or a memory such as "e-fuse"), and a driving circuit unit 13f for driving the light emitting element 12 with specified timing, and the light receiving element 13 is composed of one chip.

In the embodiment, namely, the claimed light receiving unit is composed of the position detecting light receiving unit 13a.

The position detecting light receiving unit 13a has a matrix arrangement of n (n≧2) light receiving cells arranged in a direction in which the position of the light spot moves on the position detecting light receiving unit 13a as the object to be measured for ranging moves in a direction of an optical axis of the light emitting element and m (m≧2) light receiving cells arranged in a direction perpendicular to the direction of the movement of the light spot.

The light emitting element 12 and the light receiving element 13 are placed at an interval on the lead frame 11 and are sealed with epoxy-based light permeable resin 14a, 14b by transfer molding. The lead frame 11 and the light permeable resin 14a, 14b are integrally molded by injection molding with use of light shielding resin 15, except for window parts 14c, 14d of the light permeable resin 14a, 14b that allow passage of light therethrough.

The lead frame 11 and the light permeable resin 14a, 14b integrally molded with the light shielding resin 15 are housed in a lens case 18 having a light emitting side lens 16 and a light receiving side lens 17. In the lens case 18, the light emitting side lens 16 and the light receiving side lens 17 are molded from acrylic resin, polycarbonate resin or the like which is visible-light cutting material, and a casing part is formed from ABS resin, polycarbonate resin or the like. All the parts of the lens case are integrally molded by double molding.

A size of an effective light receiving part of the CMOS area sensor, CCD area sensor, or photodiode array that forms the position detecting light receiving unit 13a is preferably small for the following reasons. First, the chip of the light receiving element 13 is thereby decreased in size and thus cost reduction is facilitated. Second, presence of unnecessary ineffective light receiving portions might cause necessity to process signals obtained in those areas and thus might result in increase in processing time and in response time of the optical ranging sensor. Third, the presence of the unnecessary ineffective light receiving portions might cause unnecessary increase in power consumption for processing the unnecessary signals from the ineffective light receiving portions. Fourth, the presence of the unnecessary ineffective light receiving portions might cause decrease in S/N in the signal processing because of capture of the unnecessary signals and might result in deterioration in performance of the optical ranging sensor.

Figure 3:
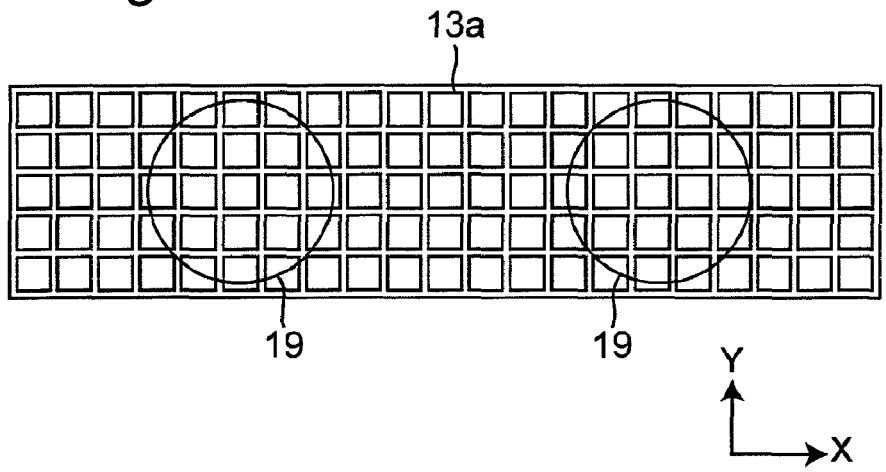
FIG. 3 is an illustration for explaining a size of an effective light receiving part in a position detecting light receiving unit of FIG. 2.

In the embodiment, as shown in FIG. 3, the effective light receiving part is composed of the whole position detecting light receiving unit 13a, and the size of the effective light receiving part along Y-direction (which is a direction perpendicular to X-direction in which a light spot 19 moves as the distance to the object to be measured changes) is made equal to a design diameter of the light spot 19 to be formed on the position detecting light receiving unit 13a. This is because a planar size of the effective light receiving part in which the whole light spot 19 can be received at maximum is sufficient for the determination of a center of gravity of the light spot 19. A unit size of the effective light receiving part is a pixel of the CMOS area sensor, CCD area sensor, or photodiode array that forms the position detecting light receiving unit 13a. This is true for the description below.

Figure 4:
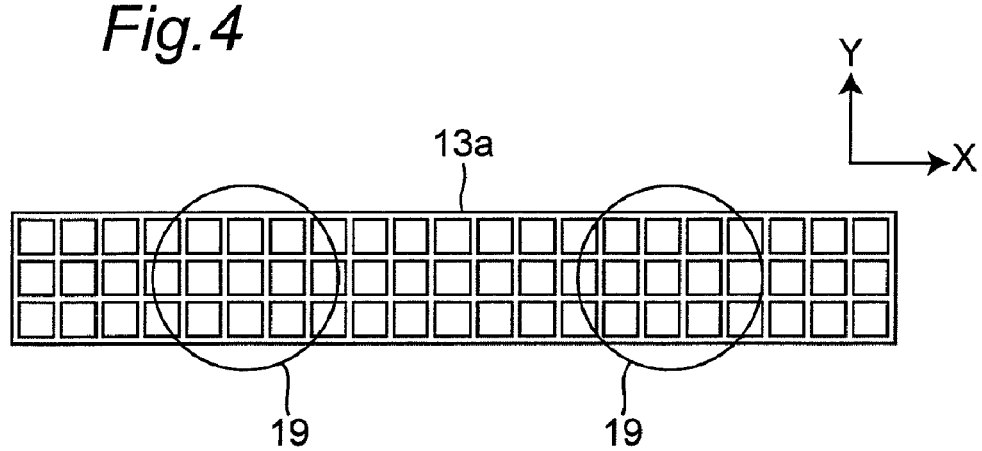
FIG. 4 is an illustration for explaining a size of an effective light receiving part different from that of FIG. 3.

In this embodiment, on condition that a quantity of light, which light is emitted from the light emitting element 12, then reflected by an object to be measured that is in the most distant position of the measurable range of the optical ranging sensor, and enters the position detecting light receiving unit 13a of the light receiving element 13, is sufficient, it does not matter if the size of the effective light receiving part (position detecting light receiving unit 13a) in the Y-direction is smaller than the design diameter of the light spot 19 as shown in FIG. 4. Even if a center of the light spot 19 is deviated from a center of the effective light receiving part in the Y-direction because of assembly variation, as shown in FIG. 5, for instance, the center of gravity of the light spot 19 can be determined and there is no problem provided that the effective light receiving part covers not less than a half of the diameter D of the light spot 19, i.e., provided that y≧D/2 holds (wherein y is a width of the effective light receiving part in the Y-direction).

In the embodiment, namely, the size of the effective light receiving part 13a in the Y-direction is made not less than a design radius and not more than the design diameter of the light spot 19 to be formed on the position detecting light receiving unit 13a.

Figure 5:
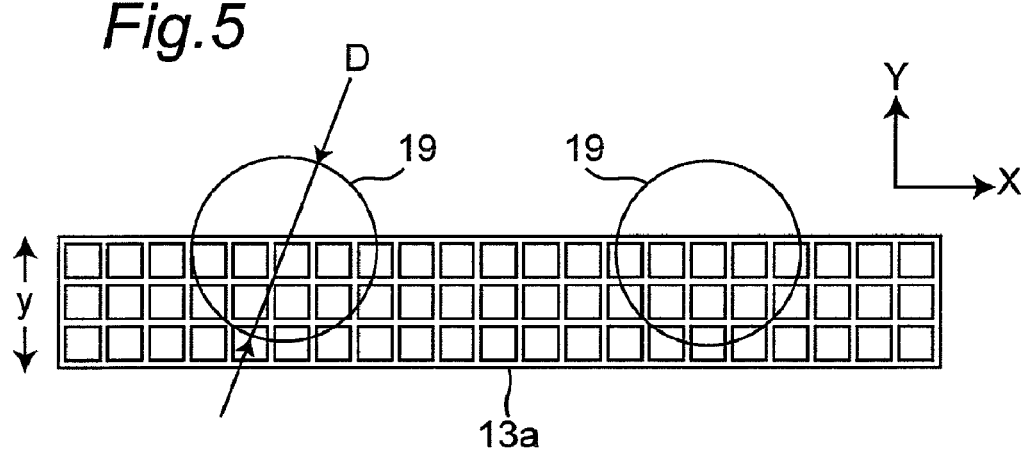
FIG. 5 is an illustration for explaining an event in which a center of a light spot is deviated from a center of the effective light receiving part in FIG. 4.

In a method of setting the size of the effective light receiving part, other than the setting method based on the design size of the light spot 19 as shown in FIGS. 3 through 5, the width in the Y-direction of the position detecting light receiving unit 13a with m rows and n columns (m≧2, n≧2) is made larger than a width of the light spot in the Y-direction. Then, the size of the effective light receiving part in the position detecting light receiving unit 13a is designed on basis of an actual position of the light spot formed on the position detecting light receiving unit 13a, and parts thereof other than the effective light receiving part are blocked from functioning as the light receiving part for ranging.

Specifically, as shown in FIG. 6, the position detecting light receiving unit 13a is first produced so as to be larger in size in plan view than the design diameter D of the light spot 19. Then, during a process of manufacturing the optical ranging sensor, unnecessary portions 20a, 20b where the light spot 19 is not formed with the movement of the object to be measured are determined so that those unnecessary portions 20a, 20b are blocked from functioning as the light receiving part for ranging. This makes it possible to define the effective light receiving part for each product optimally for actual positions of the light spot 19, even if variation occurs relative to design positions of the light spot 19 in the manufacturing processes.

There is no limitation on how to block the unnecessary portions 20a, 20b in the position detecting light receiving unit 13a from functioning as the light receiving part for ranging. For instance, output signals from the light receiving cells arranged in the unnecessary portions 20a, 20b may be blocked from being inputted into the processing circuit unit 13b.

It does not matter at all if the unnecessary portions 20a, 20b in the position detecting light receiving unit 13a are used as light receiving parts for a purpose other than ranging.

In a method of determining the unnecessary portions 20a, 20b in such a configuration, either one of a position G1 of an actual center of gravity or light intensity peak of a long-distance side light spot 19 that is formed on the position detecting light receiving unit 13a when the object to be measured is in a position at the longest distance of the measurable range and a position G2 of an actual center of gravity or light intensity peak of a short-distance side light spot 19 that is formed on the position detecting light receiving unit 13a when the object to be measured is in a position at the shortest distance of the measurable range is detected during the process of manufacturing the optical ranging sensor. Then two adjoining strip-like areas each having a width as large as the design radius r of the light spot 19 that has been determined in advance are defined on both sides of the detected position G1, G2 of the center of gravity or the light intensity peak with respect to the Y-direction, and the effective light receiving part having a width of 2r in the Y-direction is defined by combination of both the areas. In the method, areas except the effective light receiving part are defined as the unnecessary portions 20a, 20b.

More plainly, the area that has the center in the Y-direction on the position G1, G2 of the actual center of gravity or the light intensity peak of the light spot 19 formed on the position detecting light receiving unit 13a and that has the width in the Y-direction as large as the design diameter 2r (=D) of the light spot 19 is defined as the effective light receiving part.

As shown in FIG. 7, unnecessary portions in the position detecting light receiving unit 13a appear with respect to the X-direction in which the light spot 19 moves. A method of defining the unnecessary portions with respect to the X-direction is executed as follows.

On the position detecting light receiving unit 13a in which the effective light receiving part with respect to the Y-direction ("Y-direction effective light receiving part") and the unnecessary portions 20a, 20b with respect to the Y-direction are defined as shown in FIG. 6, the position G1 of an actual center of gravity or light intensity peak of the long-distance side light spot 19a is detected in the process of manufacturing the optical ranging sensor. Then the position G2 of an actual center of gravity or light intensity peak of the short-distance side light spot 19b is detected. With respect to the y-direction effective light receiving part, an area between a defined position that is defined outside the position G1 in the X-direction by the design radius r of the light spot 19 determined in advance and a defined position that is defined outside the position G2 in the X-direction by the design radius r of the light spot 19 determined in advance is defined as the effective light receiving part, and areas except the area are defined as unnecessary portions 21a, 21b.

Consequently, the effective light receiving part in the position detecting light receiving unit 13a can be defined in a minimum necessary size.

The positions G1, G2 detected for the definition of the sizes thereof in the Y-direction may be used also as positions G1, G2 of the actual centers of gravity or the light intensity peaks of the light spot 19 for the definition of the sizes of the unnecessary portions in the X-direction.

The size of the effective light receiving part in the Y-direction is not limited to "2r" and it does not matter if only the size is "not less than r and not more than 2r" as described with reference to FIG. 5.

For the above method of defining the size of the effective light receiving part in the Y-direction on basis of the actual positions of the light spot, an example has been described in which, for the sake of simple description, the position G1, G2 of the actual center of gravity or light intensity peak in the Y-direction and the radius r are the same between the long-distance side light spot 19 and the short-distance side light spot 19. Actually, however, deviations occur between the position G1 in the Y-direction and the radius r1 of the long-distance side light spot 19 and the position G2 in the Y-direction and the radius r2 of the short-distance side light spot 19, depending on a range of movement of the object to be measured in the direction of the optical axis of the light emitting element 12.

Figure 8:
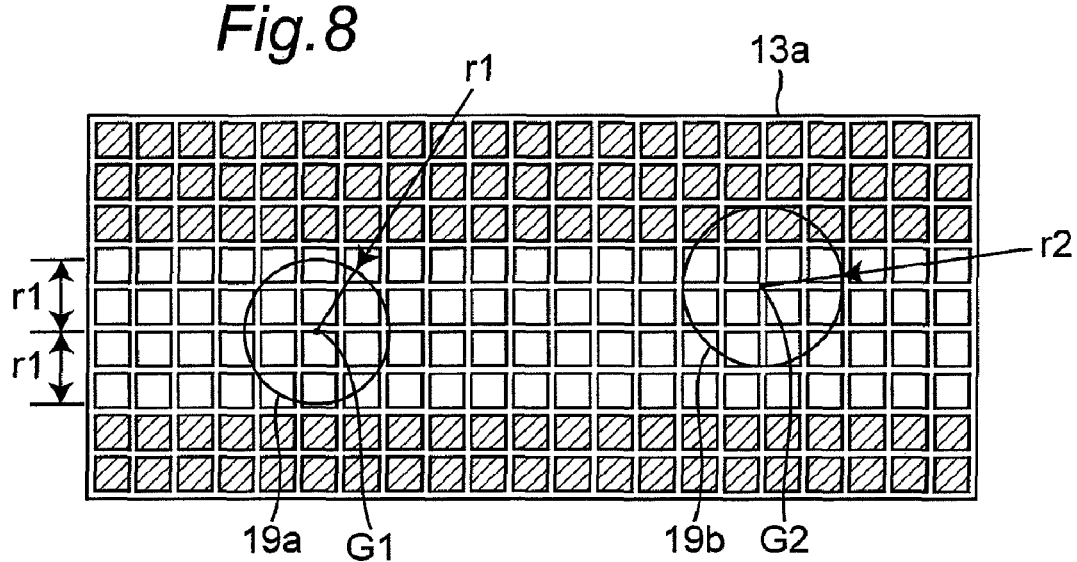
FIG. 8 is an illustration for explaining a method of defining the effective light receiving part which method is different from the methods of FIGS. 6 and 7.

Under a condition of r1<r2, for instance, as shown in FIG. 8, two adjoining strip-like areas each having a width equal to the actual radius r1 of the long-distance side light spot 19a that has been determined in advance are defined on both sides, with respect to the Y-direction, of the detected actual position G1 of the long-distance side light spot 19a having the smaller radius, and the effective light receiving part having a width of 2×r1 in the Y-direction is defined by combination of both the areas. More plainly, the area that has a center in the Y-direction on the actual position G1 of the long-distance side light spot 19a and that has the width in the Y-direction as large as the actual diameter 2·r1 of the long-distance side light spot 19a is defined as the effective light receiving part. In that case, the deviation between the position G1 and the position G2 and a difference between the radius r1 and the radius r2 are so slight that the center of gravity of the short-distance side light spot 19b having the larger radius can safely be determined in actual use even though the size of the effective light receiving part in the Y-direction is defined on basis of the radius r1 of the long-distance side light spot 19a having the smaller radius.

In this case, it does not matter if the size of the effective light receiving part in the Y-direction is defined on basis of the position G2 and the radius r2 of the short-distance side light spot 19b having the larger radius. In this case also, as a matter of course, the center of gravity of the long-distance side light spot 19a having the smaller radius can be determined in actual use.

The above is in common with a condition of r1>r2.

Figure 9:
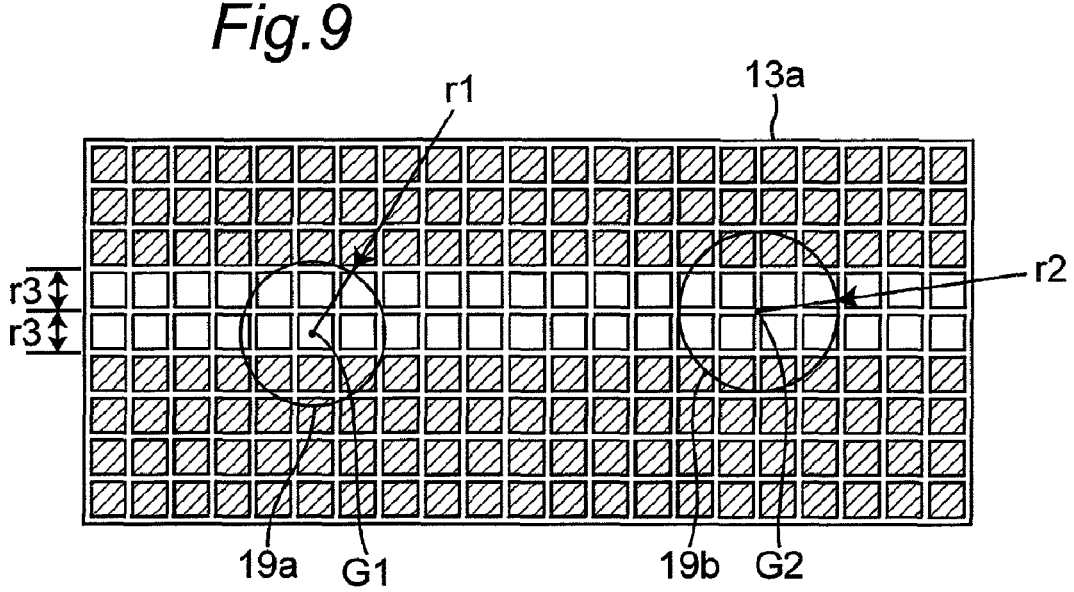
FIG. 9 is an illustration for explaining a method of defining the effective light receiving part which method is different from the methods of FIGS. 6 through 8.

On condition that the position G1 in the Y-direction and the radius r1 of the long-distance side light spot 19 are different from the position G2 in the Y-direction and the radius r2 of the short-distance side light spot 19, respectively, the size of the effective light receiving part in the Y-direction may be defined as shown in FIG. 9.

Specifically, a midpoint between the position G1 and the position G2 in the Y-direction is determined and is set as a reference point. In this case, a position that can be defined as the reference point is between pixels in the CMOS area sensor, CCD area sensor, or photodiode array that forms the position detecting light receiving unit 13a. Thus, the position of the reference point in FIG. 9 is the same as the position G2 of the light spot 19b.

Subsequently, a mean length r3 between the radius r1 and the radius r2 is determined by the following equation:

$$r3=(r1+r2)/2$$

Then two adjoining strip-like areas each having a width equal to the determined length r3 are defined on both sides of the position of the reference point with respect to the Y-direction, and the effective light receiving part having a width of 2·r3 in the Y-direction is defined by combination of both the areas. More plainly, the area that has a center in the Y-direction on the position of the reference point and that has the width (2·r3) in the Y-direction twice as large as the determined length r3 is defined as the effective light receiving part. In that case, the deviation between the position G1 and the position G2 and the difference between the radius r1 and the radius r2 are so slight that the center of gravity of the short-distance side light spot 19b having the larger radius can safely be determined in actual use even though the size of the effective light receiving part in the Y-direction is defined with use of a position identical to the position G1 of the long-distance side light spot 19a, as the position of the reference point.

In the examples of FIGS. 8 and 9 as well, unnecessary portions with respect to the X-direction can be defined as in the case of FIG. 7.

Among methods of defining the effective light receiving part on basis of the actual light spot is a method with use of the position and light intensity distribution, other than the methods with use of the actual position of the light spot.

Figure 10:
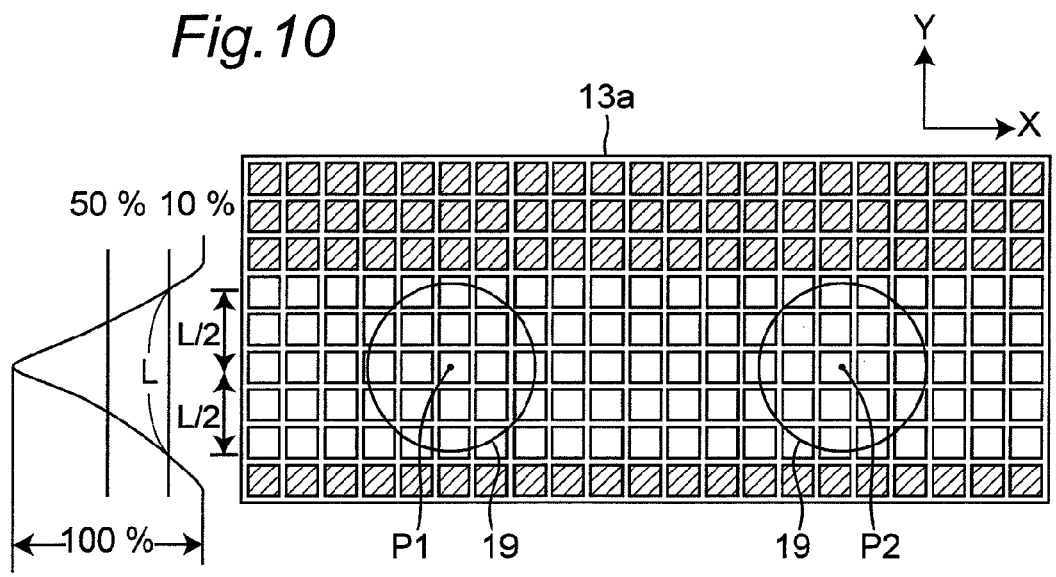
FIG. 10 is an illustration for explaining a method of defining the effective light receiving part which method is different from the methods of FIGS. 6 through 9.
Figure 11:
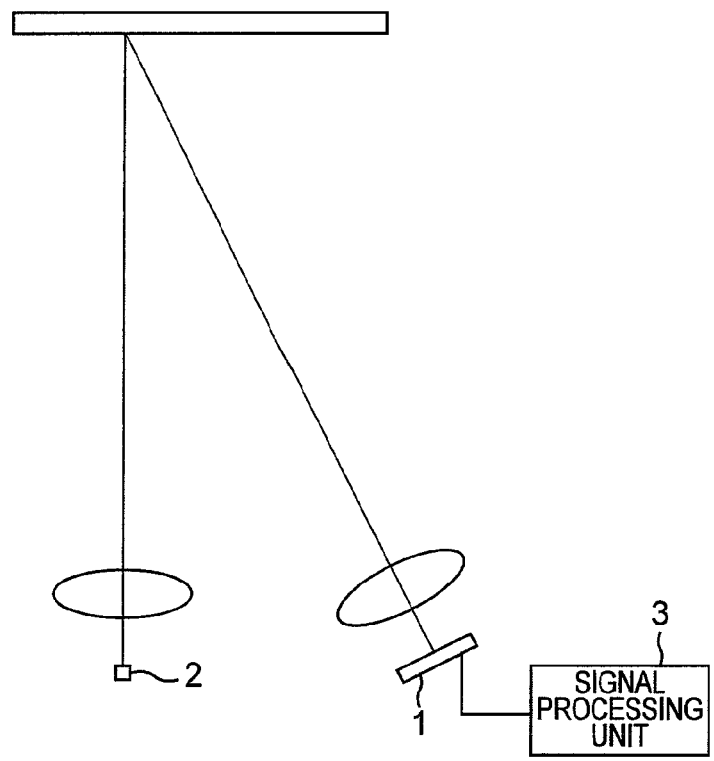
FIG. 11 is a diagram showing a schematic configuration of a conventional optical ranging sensor.
Figure 12:
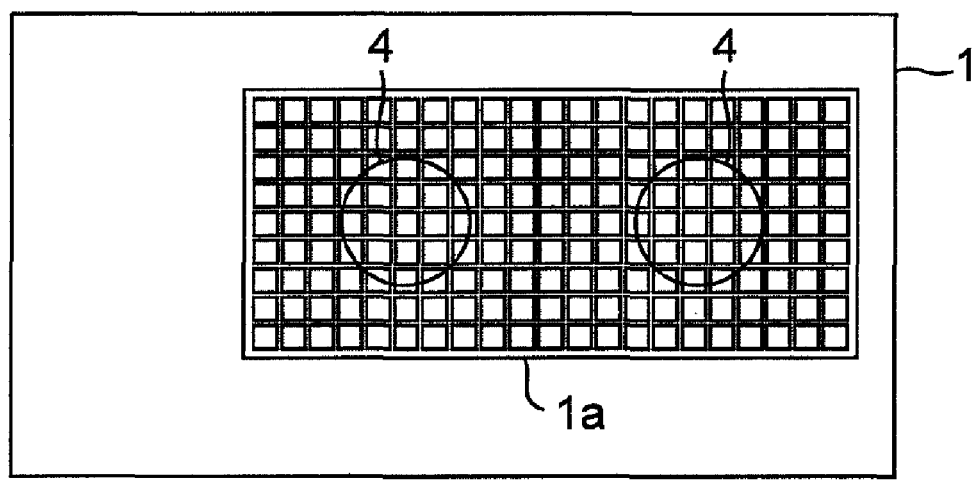
FIG. 12 is a plan view of a CMOS image sensor in FIG. 11.

Specifically, as shown in FIG. 10, the position detecting light receiving unit 13a is produced so as to be larger in size in plan view than the design diameter D of the light spot 19. During the process of manufacturing the optical ranging sensor, either one of a position P1 of an actual light intensity peak of the long-distance side light spot 19 and a position P2 of an actual light intensity peak of the long-distance side light spot 19 is detected. Then a light intensity distribution of the light spot 19 is found and a size L, measured in the Y-direction, of an area that shows 10% of a light intensity at a light intensity peak of the distribution is determined. Then two adjoining strip-like areas each having a width generally half as large as the determined size L are defined on both sides of the position P1, P2 of the light intensity peak with respect to the Y-direction, and the effective light receiving part having a width L in the Y-direction is defined by combination of both the areas. Areas thereof except the effective light receiving part are defined as unnecessary portions.

More plainly, the area that has the center in the Y-direction on the position P1, P2 of the actual light intensity peak of the light spot 19 formed on the position detecting light receiving unit 13a and that has the width in the Y-direction as large as the size L, measured in the Y-direction, of the area that shows 10% of the light intensity at the light intensity peak of the light intensity distribution of the light spot 19 is defined as the effective light receiving part.

This method makes it possible to accurately define the effective light receiving part for each product in accordance with the actual position and the actual size of the light spot 19, even if variations occur with respect to the design position and the design size of the light spot 19 in the manufacturing processes.

The area of the light intensity distribution for the determination of the width of the effective light receiving part in the Y-direction has only to be an area having a value selected from a range of not less than 10% but not more than 50% of the light intensity at the light intensity peak. With use of the effective light receiving part defined on basis of the area with 10% or more of the light intensity at the light intensity peak, the whole area or substantially the whole area of the actual light spot 19 can be captured and the position of the center of gravity of the light spot 19 can accurately be determined.

As described above, however, it is advantageous in terms of cost, response time, power consumption and performance of the optical ranging sensor to make the effective light receiving surface as small as possible. However, even if the light quantity is sufficient, the effective light receiving part defined on basis of the area with light intensities greater than about 50% of the light intensity at the light intensity peak is not preferable because decrease in the width in the Y-direction causes deterioration in accuracy of the determination of the center of gravity of the light spot 19 formed on the position detecting light receiving unit 13a.

Consequently, the area with a light intensity of not less than about 10% but not more than about 50% of the light intensity at the light intensity peak is adequate for the area of the light intensity for the determination of the width of the effective light receiving part performed during the process of manufacturing the optical ranging sensor.

Though not described in detail, it does not matter if the effective light receiving part in the position detecting light receiving unit 13a is defined in the minimum necessary size by narrowing, in the manner as shown in FIG. 7, the effective light receiving part having the width in the Y-direction defined (Y-direction effective light receiving part) as shown in FIG. 10 by making both ends of the effective light receiving part unnecessary portions, on basis of the region that shows a specified percentage of not less than 10% and not more than about 50% of the light intensity at the light intensity peak of the light intensity distribution of the light spot 19.

When there are deviations between the position P1 in the Y-direction and radius of the long-distance side light spot 19 and the position P2 in the Y-direction and radius of the short-distance side light spot 19, the position and size of the effective light receiving part in the Y-direction can be defined on the basis of the long-distance side light spot 19a having the smaller radius as in FIG. 8 or on the basis of the short-distance side light spot 19b having the larger radius. Alternatively, the position and size of the effective light receiving part in the Y-direction can be defined on the basis of both the long-distance side light spot 19a and the short-distance side light spot 19b as in FIG. 9.

In the embodiment, as described above, the light emitting element 12 and the light receiving element 13 are mounted on the one lead frame 11, are integrally molded with use of the light permeable resin 14a, 14b and the light shielding resin 15, and are housed in the lens case 18 having the light emitting side lens 16 and the light receiving side lens 17. That is, the effective light receiving part of the position detecting light receiving unit 13a forming the light receiving element 13 is flush with the light emitting element 12. The light receiving element 13, in which the position detecting light receiving unit 13a, the processing circuit unit 13b, the signal processing software memory unit 13c, the signal processing data memory unit 13d, and the driving circuit unit 13f are installed, is formed in one chip. This reduces the size of the optical ranging sensor as a whole and the manufacturing cost for the sensor.

Besides, the size of the effective light receiving part of the position detecting light receiving unit 13a in the Y-direction perpendicular to the X-direction in which the light spot 19 moves as the distance to the object to be measured changes, is made not less than the design radius and not more than the design diameter of the light spot 19 formed on the position detecting light receiving unit 13a. Furthermore, unnecessary portions of the position detecting light receiving unit 13a are blocked from functioning as the light receiving part for ranging. This makes it possible to reduce the size of the chip of the light receiving element 13, which can further reduce the size of the whole optical ranging sensor and the manufacturing cost. Moreover, the elimination of ineffective light receiving portions of the position detecting light receiving unit 13a leads to elimination of unnecessary signals from such ineffective light receiving portions and reduces processing time in the processing circuit unit 13b, hence, response time of the optical ranging sensor, and power consumption. In addition, the elimination of the unnecessary signals increases the S/N ratio in the signal processing and improves the performance of the optical ranging sensor.

The position detecting light receiving unit 13a is produced so as to be larger in size than the design diameter D of the light spot 19, and the effective light receiving part is defined in the manufacturing process on the basis of the long-distance side and/or short-distance side actual light spots 19 that are actually formed on the position detecting light receiving unit 13a, with areas except the effective light receiving part defined as unnecessary portions 20a, 20b, 21a and 21b. The unnecessary portions 20a, 20b, 21a, 21b are blocked from functioning as the light receiving part and thus the effective light receiving part can be defined in the minimum necessary size on the basis of the actual light spot 19 formed on the position detecting light receiving unit 13a.

This makes it possible to optimally define the effective light receiving part for each product in accordance with the actual position and the actual size of the light spot 19 even if variations occur with respect to the design position and the design size of the light spot 19 due to manufacturing processes.

In conclusion, the embodiment provides an optical ranging sensor that is capable of accurately measuring a distance to even a low-reflectance object to be measured that is on distant side of a wide distance measuring range, with use of triangulation, and that fulfils small size, high performance, low power consumption, high-speed response, and low cost, and electronic equipment. Besides, an optical ranging sensor that attains high accuracy even in presence of assembly variation can be provided.

Furthermore, installation in a personal computer of the optical ranging sensor that fulfils small size, high performance, low power consumption, high-speed response, and low cost as described above makes it possible to accurately and quickly detect a human in front of the computer and to drive the computer into sleep mode when the human gets away therefrom. Increase in size, power consumption, and cost caused by the installation of the optical ranging sensor can be minimized and energy saving can efficiently be achieved.

Also, installation of the optical ranging sensor in a cellular phone with camera makes it possible to accurately and quickly measure a distance to an object and to attain a function of automatically adjusting focus at high speed (auto-focus function). Increase in size, power consumption, and cost caused by the installation of the optical ranging sensor can be minimized.

Also, installation of the optical ranging sensor in a projector makes it possible to accurately and quickly measure a distance to a screen and to attain a function of automatically adjusting focus at high speed (auto-focus function). Increase in size, power consumption, and cost caused by the installation of the optical ranging sensor can be minimized.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

CITATION LIST

11 ... lead frame,
12 ... light emitting element,
13 ... light receiving element,
13a ... position detecting light receiving unit,
13b ... processing circuit unit,
13c ... signal processing software memory unit,
13d ... signal processing data memory unit,
13e ... memory unit,
13f ... driving circuit unit,
14a, 14b ... light permeable resin,
14c, 14d ... window parts of light permeable resin,
15 ... light shielding resin,
16 ... light emitting side lens,
17 ... light receiving side lens,
18 ... lens case,
19, 19a, 19b ... light spot,
20a, 20b, 21a, 21b ... unnecessary portions in position detecting light receiving unit,
G1, G2 ... position of center of gravity or light intensity peak of light spot,
D ... diameter of light spot,
r ... radius of light spot,
P1, P2 ... position of light intensity peak of light spot.

The invention claimed is:

1. An optical ranging sensor comprising:
a light emitting unit for projecting a light beam on an object to be measured,
a light receiving unit on which reflected light resulting from reflection of the light beam from the object to be measured is incident and on which a light spot of the reflected light is formed, and
a processing circuit unit for processing output signals from the light receiving unit and detecting a distance to the object to be measured,
the light receiving unit including an effective light receiving part having a plurality of light receiving cells arranged in matrix form in a first direction in which a position of the light spot moves as the object to be measured moves along a direction of an optical axis of the light emitting unit, and in a second direction orthogonal to the first direction, and
a size of the effective light receiving part in the second direction being not smaller than a radius of the light spot but not larger than a diameter thereof,
wherein the effective light receiving part is composed of an area in the light receiving unit, and
wherein areas except the effective light receiving part in the light receiving unit are blocked from functioning as light receiving parts for ranging.

2. The optical ranging sensor as claimed in claim 1, wherein
the size of the effective light receiving part in the second direction is equal to the radius of the light spot.

3. The optical ranging sensor as claimed in claim 1, wherein
the effective light receiving part is an area that includes an actual center of gravity, in the second direction, of the light spot formed on the light receiving unit, or an actual light intensity peak, in the second direction, of the light spot formed on the light receiving unit, and has a width in the second direction equal to or larger than a design radius, determined in advance, of the light spot and equal to or smaller than a design diameter, determined in advance, of the light spot.

4. The optical ranging sensor as claimed in claim 3, wherein
the effective light receiving part is an area in the effective light receiving part having the defined width in the second direction, which area is between a position defined outside, in the first direction, of a position of a center of gravity or a light intensity peak of a long-distance side light spot by the design radius of the light spot, the long-distance side light spot being a light spot formed on the light receiving unit when the object to be measured is in a position at a longest distance of a measurable range, and a position defined outside, in the first direction, of a position of a center of gravity or a light intensity peak of a short-distance side light spot by the design radius of the light spot, the short-distance side light spot being a light spot formed on the light receiving unit when the object to be measured is in a position at a shortest distance of the measurable range.

5. The optical ranging sensor as claimed in claim 1, wherein
the effective light receiving part is an area that includes an actual light intensity peak, in the second direction, of the light spot formed on the light receiving unit, and has a width in the second direction defined by a region, in the second direction, in a light intensity distribution of the light spot which region shows a light intensity at a specified percentage of the light intensity peak.

6. The optical ranging sensor as claimed in claim 5, wherein
the effective light receiving part is an area in the effective light receiving part having the defined width in the second direction, which area is between a position defined outside, in the first direction, of a position of a light intensity peak of a long-distance side light spot by a half of a size measured in the first direction of a region that shows a light intensity at a specified percentage of the light intensity peak, the long-distance side light spot being a light spot formed on the light receiving unit when the object to be measured is in a position at a longest distance of a measurable range, and a position defined outside, in the first direction, of a position of a light intensity peak of a short-distance side light spot by a half of a size measured in the first direction of a region that shows a light intensity at the specified percentage of the light intensity peak, the short-distance side light spot being a light spot formed on the light receiving unit when the object to be measured is in a position at a shortest distance of the measurable range.

7. The optical ranging sensor as claimed in claim 5, wherein
the specified percentage of the light intensity peak is a value selected from a range of from 10% to 50%, inclusive, of the light intensity at the light intensity peak.

8. The optical ranging sensor as claimed in claim 1, further comprising:
a signal processing software memory unit in which a program for signal processing to be performed by the processing circuit unit is stored,
a memory unit in which data including data obtained from the signal processing performed by the processing circuit unit is stored, and
a driving circuit unit for driving the light emitting element with specified timing, wherein
the light emitting unit and the light receiving unit are installed on an identical plane, and wherein
the processing circuit unit, the signal processing software memory unit, the memory unit, and the driving circuit unit, together with the light receiving unit, are formed in one chip.

9. Electronic equipment comprising:
the optical ranging sensor as claimed in claim 1.

10. Electronic equipment comprising:
the optical ranging sensor as claimed in claim 8.

11. An optical sensor, comprising:
a light emitting unit for projecting a light beam on an object to be measured;
a light receiving unit on which reflected light resulting from reflection of the light beam from the object to be measured is incident and on which a light spot of the reflected light is formed; and
a processing circuit unit for processing output signals from the light receiving unit and detecting a distance to the object to be measured,
the light receiving unit including an effective light receiving part having a plurality of light receiving cells arranged in matrix form in a first direction in which a position of the light spot moves as the object to be measured moves along a direction of an optical axis of the light emitting unit, and in a second direction orthogonal to the first direction, and
a size of the effective light receiving part in the second direction being not smaller than a radius of the light spot but not larger than a diameter thereof, and wherein
the effective light receiving part is composed of an area in the light receiving unit,
areas except the effective light receiving part in the light receiving unit comprise a plurality of receiving cells arranges in matrix form in the first and second directions,
output from the light receiving cells of the effective light receiving part are processed by the processing circuit unit for detection of the distance to the object to be measured, and
output from the light receiving cells of the areas except the effective light receiving part are not used for detection of the distance to the object to be measured.

12. The optical ranging sensor as claimed in claim 11, wherein
the effective light receiving part is an area that includes an actual center of gravity, in the second direction, of the light spot formed on the light receiving unit, or an actual light intensity peak, in the second direction, of the light spot formed on the light receiving unit, and has a width in the second direction equal to or larger than a design radius, determined in advance, of the light spot and equal to or smaller than a design diameter, determined in advance, of the light spot.

13. The optical ranging sensor as claimed in claim 12, wherein
the effective light receiving part is an area in the effective light receiving part having the defined width in the second direction, which area is between a position defined outside, in the first direction, of a position of a center of gravity or a light intensity peak of a long-distance side light spot by the design radius of the light spot, the long-distance side light spot being a light spot formed on the light receiving unit when the object to be measured is in a position at a longest distance of a measurable range, and a position defined outside, in the first direction, of a position of a center of gravity or a light intensity peak of a short-distance side light spot by the design radius of the light spot, the short-distance side light spot being a light spot formed on the light receiving unit when the object to be measured is in a position at a shortest distance of the measurable range.

14. The optical range sensor as claimed in claim 11, wherein the effective light receiving part is an area that includes an actual light intensity peak, in the second direction, of the light spot formed on the light receiving unit, and has a width in the second direction defined by a region, in the second direction, in a light intensity distribution of the light spot which region shows a light intensity at a specified percentage of the light intensity peak.

15. The optical ranging sensor as claimed in claim 14, wherein the effective light receiving part is an area in the effective light receiving part having the defined width in the second direction, which area is between a position defined outside, in the first direction, of a position of a light intensity peak of a long-distance side light spot by a half of a size measured in the first direction of a region that shows a light intensity at a specified percentage of the light intensity peak, the long-distance side light spot being a light spot formed on the light receiving unit when the object to be measured is in a position at t longest distance of a measurable range, and a position defined outside, in the first direction, of a position of a light intensity peak of a short-distance side light spot by a half of a size measured in the first direction of a region that shows a light intensity at the specified percentage of the light intensity peak, the short-distance side light spot being a light spot formed on the light receiving unit when the object to be measured is in a position at a shortest distance of the measurable range.

16. The optical ranging sensor as claimed in claim 14, wherein the specified percentage of the light intensity peak is a value selected from a range of from 10% to 50%, inclusive, of the light intensity at the light intensity peak.

17. The optical ranging sensor as claimed in claim 11, further comprising:

a signal processing software memory unit in which a program for signal processing to be performed by the processing circuit unit is stored;

a memory unit in which data including data obtained from the signal processing performed by the processing circuit unit is stored, and a driving circuit unit for driving the light emitting element with the specific timing, wherein the processing unit and the light receiving unit are installed on an identical plane, and wherein the processing circuit unit, the signal processing software memory unit, the memory unit, and the driving circuit, together with the light receiving unit, are formed in one chip.

18. The optical ranging sensor as claimed in claim 17, wherein the one chip and the light emitting unit are placed, spaced from each other, on a lead frame, and a light emitting side lens and a light receiving side are provided in positions corresponding to the light emitting unit and the light receiving unit.

* * * * *